United States Patent
Chiu et al.

(10) Patent No.: US 12,415,409 B2
(45) Date of Patent: Sep. 16, 2025

(54) SUNROOF DEVICE

(71) Applicants: FUZHOU MINGFANG AUTOMOBILE PARTS INDUSTRY CO., LTD., Fuzhou (CN); HSIN CHONG MACHINERY WORKS CO. LTD., Taoyuan (TW)

(72) Inventors: Tzu-Heng Chiu, Taoyuan (TW); Yi-Jen Lan, Taoyuan (TW); Karim Dayoub, Taoyuan (TW); Chris Pelino, Taoyuan (TW)

(73) Assignees: FUZHOU MINGFANG AUTOMOBILE PARTS INDUSTRY CO., LTD., Fuzhou (CN); HSIN CHONG MACHINERY WORKS CO. LTD., Taoyuan (TW)

( * ) Notice: Subject to any disclaimer, the term of this patent is extended or adjusted under 35 U.S.C. 154(b) by 376 days.

(21) Appl. No.: 18/199,351

(22) Filed: May 18, 2023

(65) Prior Publication Data

US 2024/0116338 A1    Apr. 11, 2024

Related U.S. Application Data

(60) Provisional application No. 63/415,065, filed on Oct. 11, 2022.

(51) Int. Cl.
  *B60J 10/00*    (2016.01)
  *B60J 7/043*    (2006.01)
  (Continued)

(52) U.S. Cl.
  CPC .............. *B60J 10/24* (2016.02); *B60J 7/043* (2013.01); *B60J 10/15* (2016.02); *B60J 10/34* (2016.02);
  (Continued)

(58) Field of Classification Search
  CPC ........ B60J 10/24; B60J 10/2335; B60J 10/36; B60J 10/365; B60J 10/45; B60J 10/80;
  (Continued)

(56) References Cited

U.S. PATENT DOCUMENTS 5,819,472 A * 10/1998 Frost .................. B60J 10/18
                                                             428/36.9
6,598,349 B1 * 7/2003 Balbaugh ............ B60J 10/2335
                                                             49/490.1

FOREIGN PATENT DOCUMENTS

DE    29606586 U1 *  6/1996
JP     4049870 B2 *  2/2008    ............. B60J 10/24

OTHER PUBLICATIONS

DE29606586 Text (Year: 1996).*
JP4049870 Text (Year: 2008).*

* cited by examiner

*Primary Examiner* — Dennis H Pedder
(74) *Attorney, Agent, or Firm* — Chun-Ming Shih; HDLS IPR SERVICES

(57) ABSTRACT

A sunroof device includes a glass panel, a window frame and a waterproof strip. The window frame is disposed on a periphery of the glass panel. A periphery of the window frame is outward extended with an end seat. The end seat is disposed with an end plug. The end plug projects from the end seat. A projecting direction of the end plug is parallel with an outer edge of the window frame. The waterproof strip is attached on the outer edge of the window frame and is in a hollow manner to form a receiving space therein. The receiving space is in a tubular manner. The end plug is extended along a longitudinal direction of the waterproof strip to be embedded in the receiving space of the waterproof strip.

9 Claims, 8 Drawing Sheets

(51) Int. Cl.
*B60J 10/15* (2016.01)
*B60J 10/24* (2016.01)
*B60J 10/34* (2016.01)
*B60J 10/70* (2016.01)
*B60J 10/82* (2016.01)
*B60J 10/90* (2016.01)
B60J 7/00 (2006.01)

(52) U.S. Cl.
CPC ............... *B60J 10/70* (2016.02); *B60J 10/82* (2016.02); *B60J 10/90* (2016.02); *B60J 7/00* (2013.01)

(58) Field of Classification Search
CPC ... B60J 10/82; B60J 10/86; B60J 10/70; B60J 10/30; B60J 7/043; B60J 7/00
USPC .............. 296/93, 216.06, 9; 49/475.1, 483.1, 49/484.1, 498.1
See application file for complete search history.

SUNROOF DEVICE

CROSS-REFERENCE TO RELATED APPLICATION

This patent application claims the benefit of U.S. Provisional Patent Application No. 63/415,065, filed Oct. 11, 2022, which is incorporated by reference herein.

BACKGROUND

Technical Field

The disclosure relates to a vehicle sunroof, particularly to a sunroof device which is easy to be assembled with a waterproof strip.

Related Art

A periphery of a glass plate and an inner edge of a window of a vehicle sunroof are disposed with a rubber strip for waterproofing. Generally speaking, when the rubber strip is installed onto the glass panel, the rubber strip cannot be installed onto the glass panel until a periphery of the glass panel is installed with a window frame first. In order to position the location of the distal end of the rubber strip, the window frame is usually provided with a positioning assembly, then the positioning assembly is connected to the distal end of the rubber strip for positioning the rubber strip, and the positioning assembly is assembled to the window frame. The window frame is connected to the positioning assembly by hot welding and then installed onto the glass panel. Thus, the assembling process of the related art is complicated.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

The disclosure provides a sunroof device which is easy to be assembled with a waterproof strip.

The disclosure provides a sunroof device which, which includes a glass panel, a window frame, and a waterproof strip. The window frame is disposed on a periphery of the glass panel. A periphery of the window frame is outward extended with an end seat. The end seat is disposed with an end plug. The end plug projects from the end seat. A projecting direction of the end plug is parallel with an outer edge of the window frame. The waterproof strip is attached on the outer edge of the window frame and is in a hollow manner to form a receiving space therein. The receiving space is in a tubular manner. The end plug is extended along a longitudinal direction of the waterproof strip to be engaged (embedded) into the receiving space of the waterproof strip.

In an embodiment of the disclosure, the waterproof strip is of a hollow tubular shape. The end seat and the window frame are in a one-piece form (or integrally formed). The end seat is of a flat plate shape and is perpendicular to a longitudinal direction of the waterproof strip. The end seat is formed with a through opening. The end plug projects from one of sides of the end seat. An outer edge of the frame body is formed with a channel trough extended along an outer edge of the frame body, and the waterproof strip is disposed in the channel trough. An embedding groove is formed in the channel trough, a side of the waterproof strip is protruded with an embedding strip embedded in the embedding groove. The end plug and the window frame are arranged at an interval.

In the sunroof device of the disclosure, the window frame is formed with the end seat and the end plug to be engaged with an end of the waterproof strip for the waterproof strip to be easily assembled onto the window frame.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
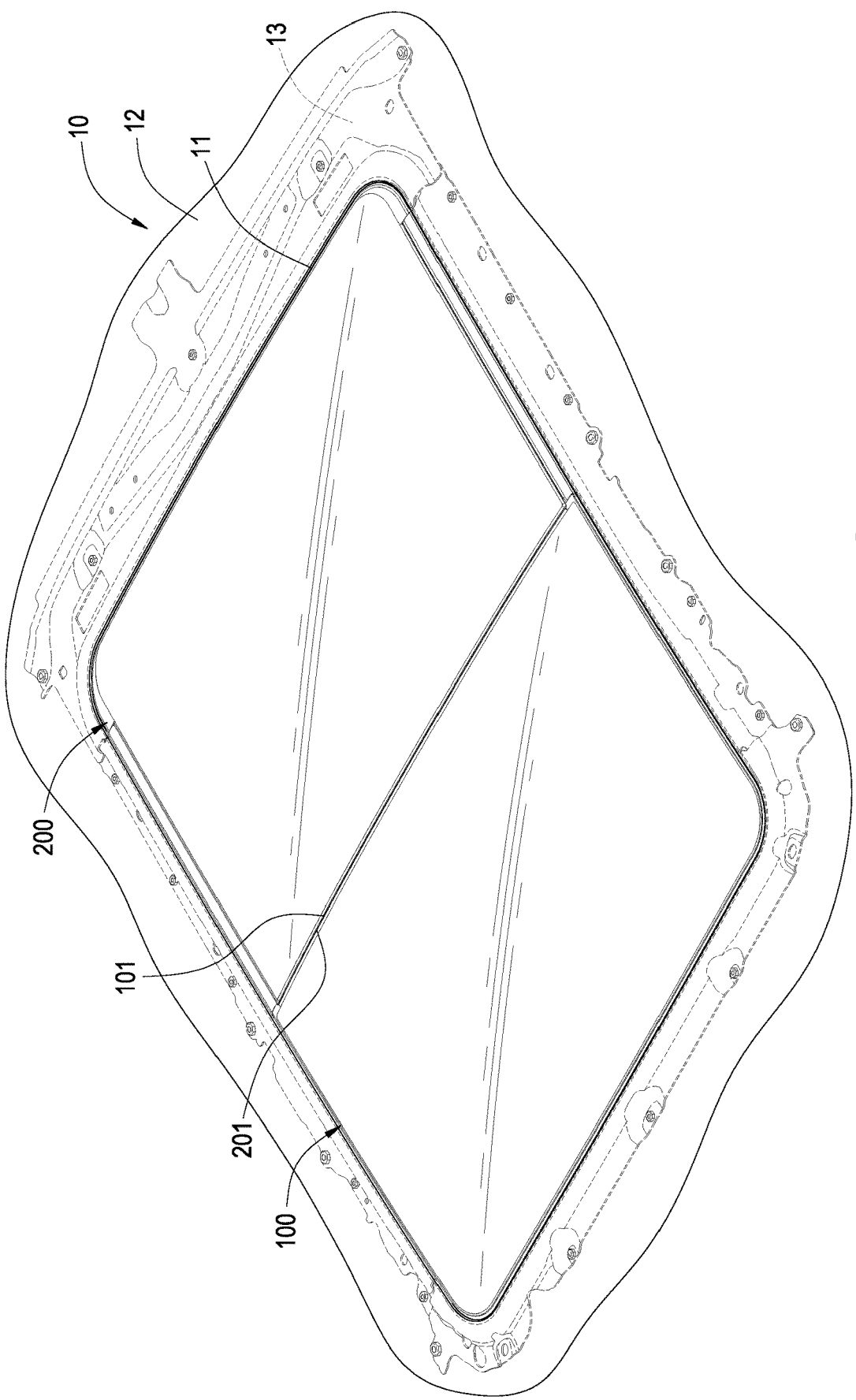
FIG. 1 is an exploded schematic view of the sunroof device of the disclosure.
Figure 2:
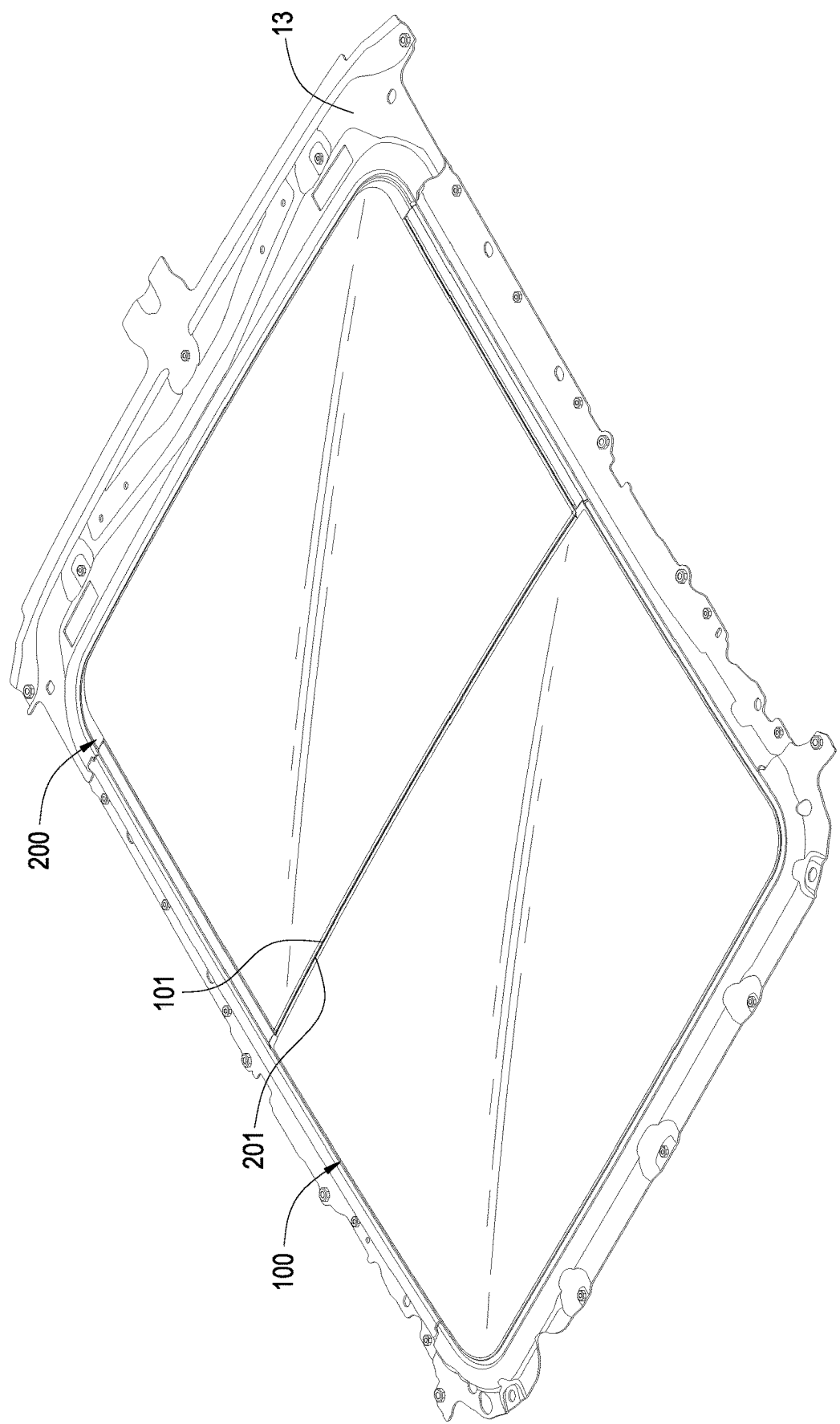
FIGS. 2 and 3 are schematic views of the sunroof device of the disclosure in a using status.
Figure 3:
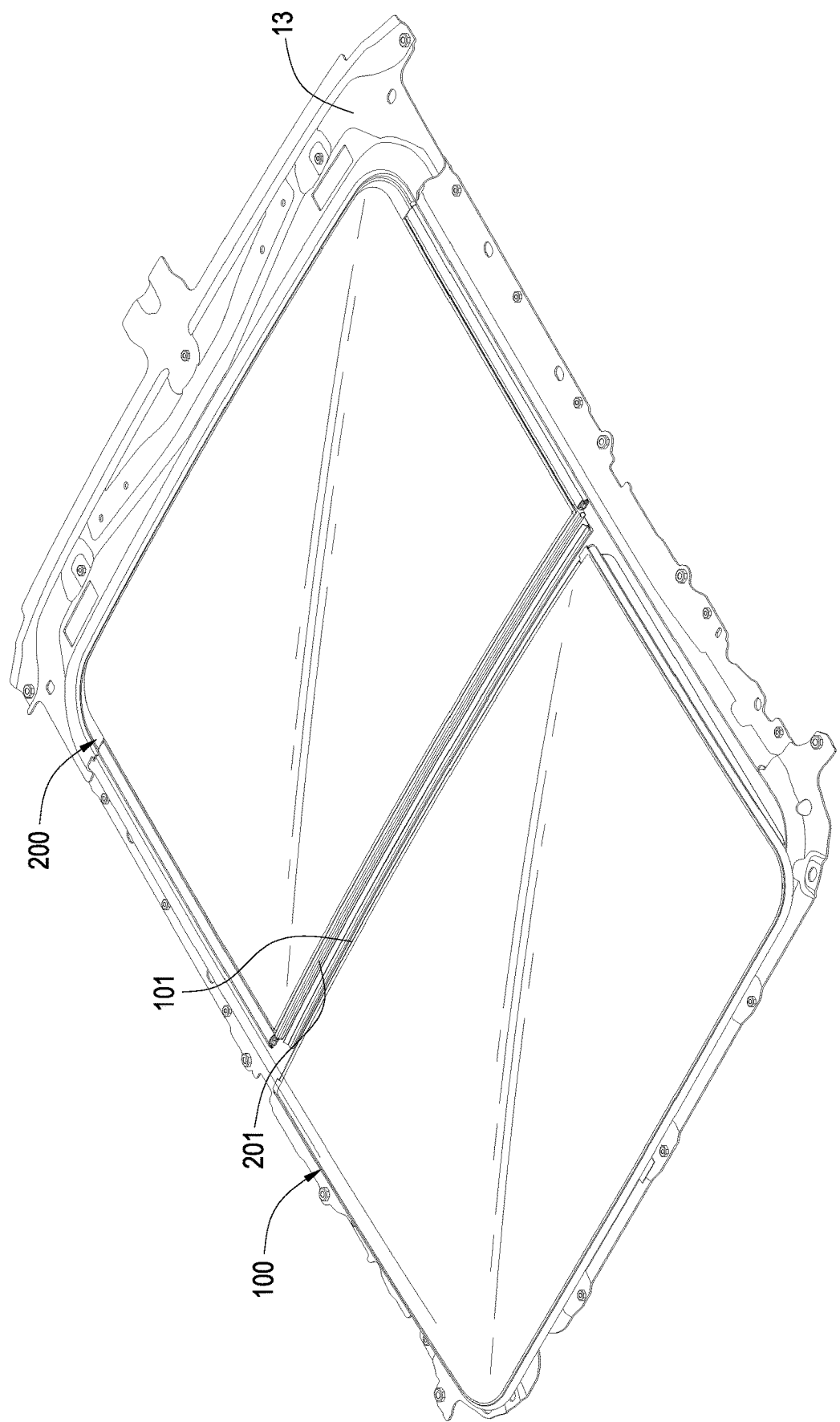

Please refer to FIGS. 1-3. An embodiment of the disclosure provides a sunroof device 100/200. The sunroof device 100 of the disclosure is disposed in a window 11 in a roof 10 of a vehicle. The sunroof device 100/200 is movably or fixedly disposed in the window 11. The sunroof device 100/200 covers at least part of the window 11. In detail, the roof 10 includes a roof plate 12 and a reinforcement frame 13. The window 11 is formed in the roof plate 12. The reinforcement frame 13 is disposed in the roof plate 12 corresponding to the window 11 for installing the sunroof device 100/200. The reinforcement frame 13 may be directly welded onto the roof plate 12.

In the embodiment, two sunroof devices 100/200 are arranged in the window 11. One of the sunroof devices 100 is movably disposed in the window 11, the other sunroof device 200 is fixedly disposed in the window 11, and the two sunroof devices 100/200 separately cover two halves of the window 11.

Please refer to FIGS. 1 and 2. The fixed sunroof device 200 covers a half of the window 11. The movable sunroof device 100 may be brought together with the fixed sunroof device 200 to cover the other half of the window 11 and close the window 11. In detail, an outline of a rear edge of the movable sunroof device 100 is matched with an outline of a front edge of the fixed sunroof 200 to be able to be brought together with each other to close. Outlines of the rest of the movable sunroof device 100 and the fixed sunroof device 200 are matched with outlines of an inner edge and the connecting portions of the window 11. Please refer to FIGS. 1 and 3. The movable sunroof device 100 may movably leave the fixed sunroof device 200 for the window 11 to be opened.

Please refer to FIGS. 1-3. In the embodiment, the two sunroof devices 100, 200 are similar in structure, and each of the movable sunroof device 100 and the fixed sunroof device 200 has the same structure of the technical features of the disclosure. Thus, the following description only takes the movable sunroof device 100 as an example to illustrate the technical features of the disclosure.

Figure 4:
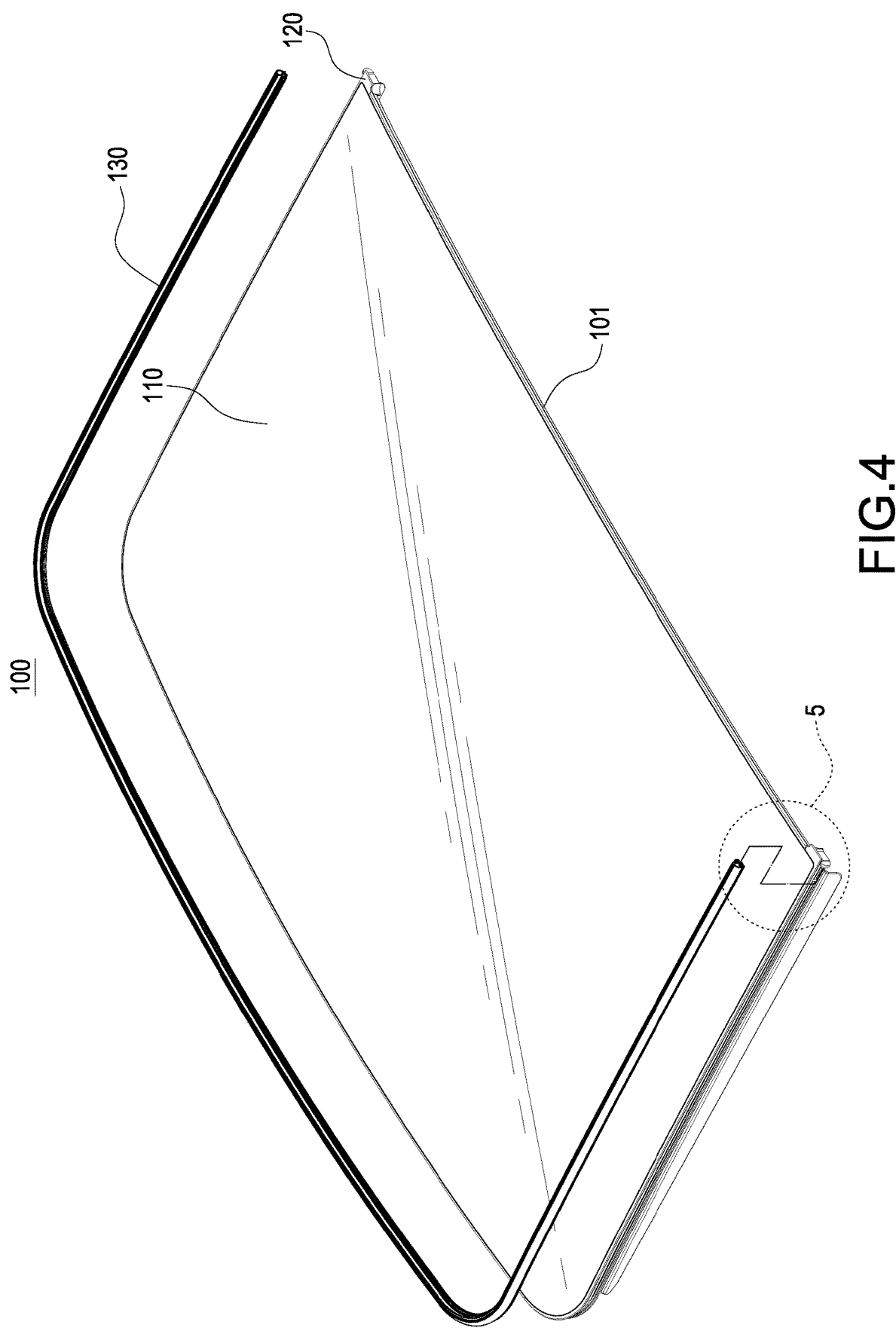
FIG. 4 is an exploded view of the sunroof device of the disclosure
Figure 5:
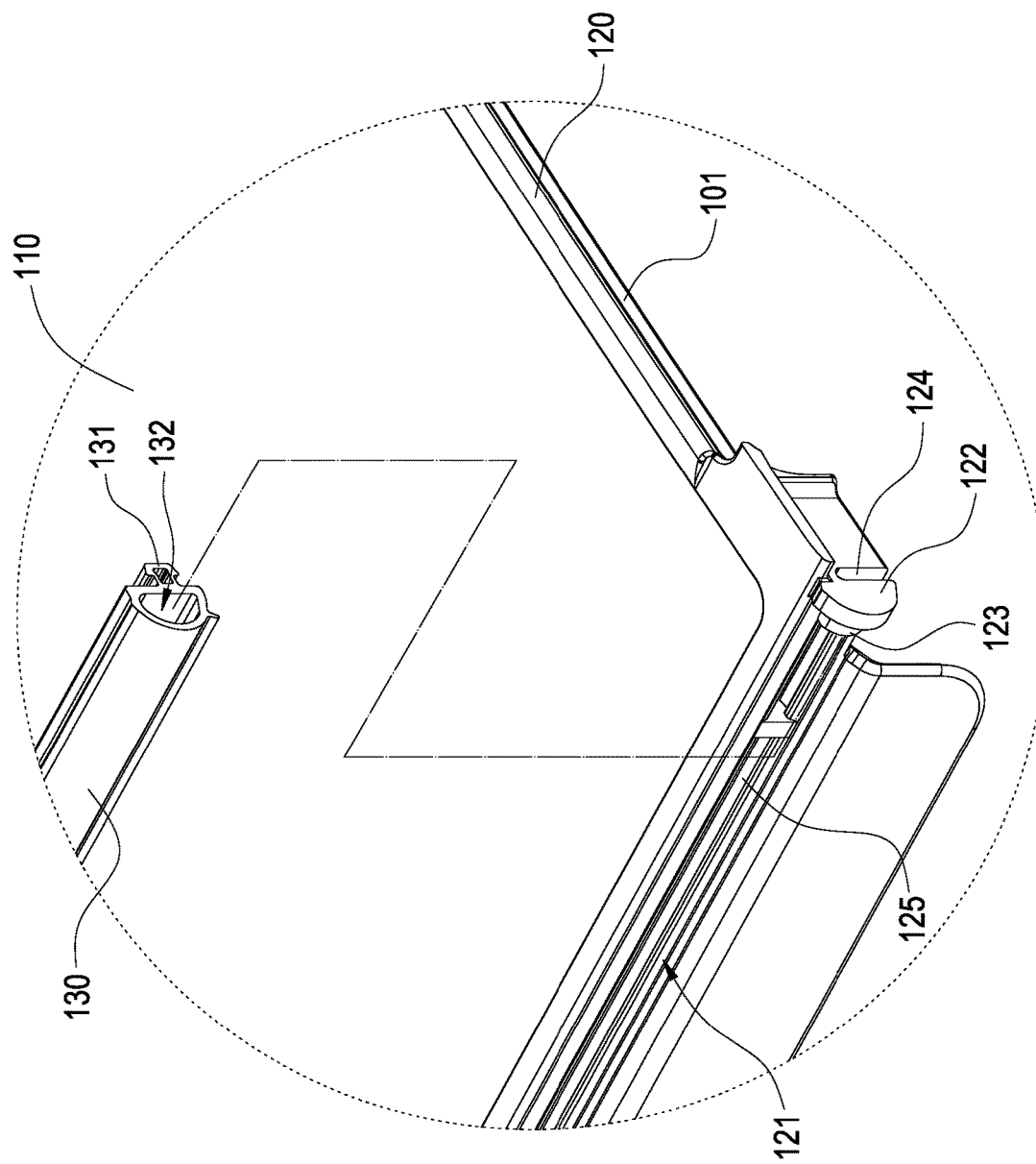
FIG. 5 is a partially enlarged view of area 4 in FIG. 3.
Figure 6:
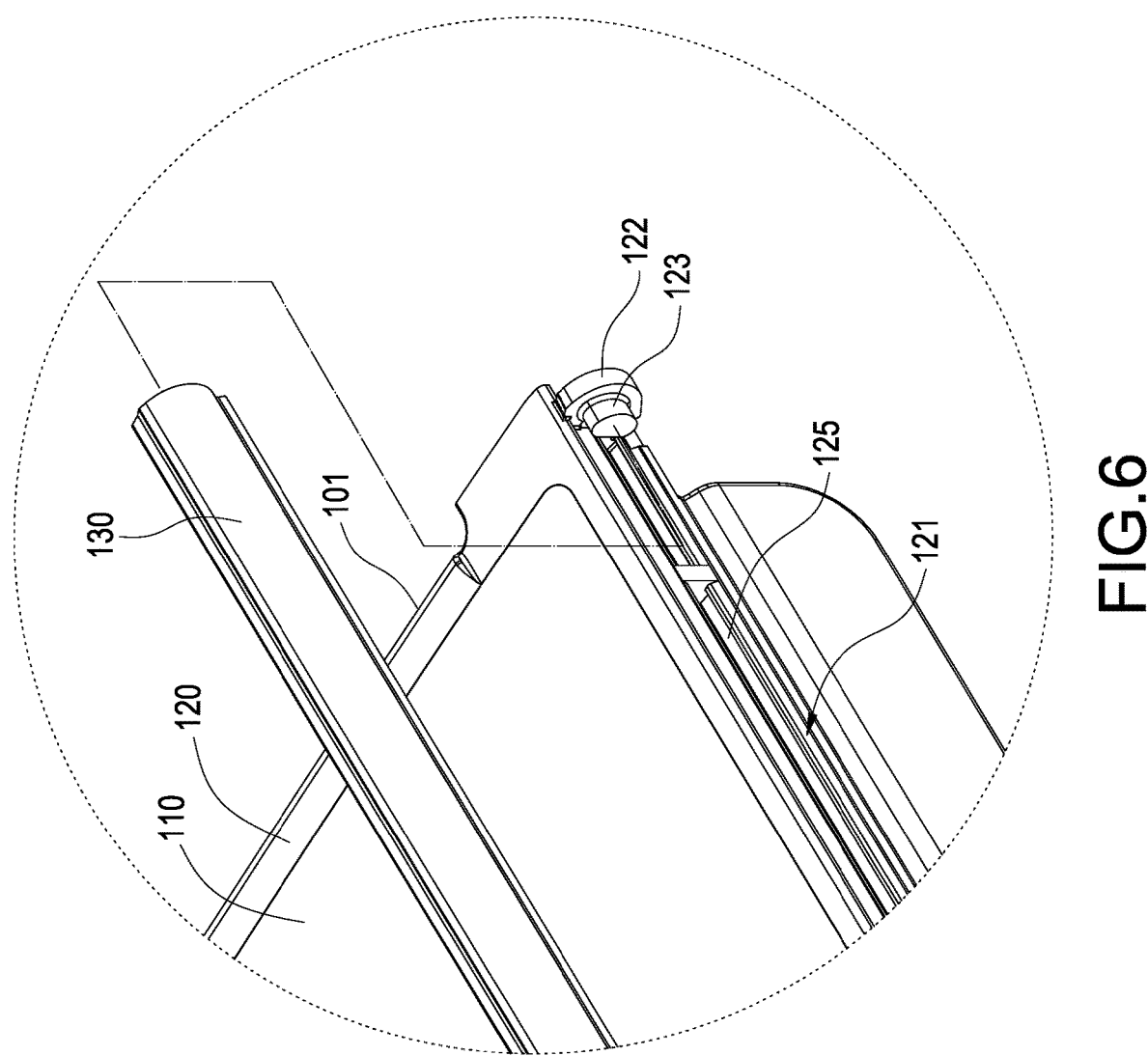
FIG. 6 is a schematic view of the end seat of the sunroof device of the disclosure.

Please refer to FIGS. 4-6. Each sunroof device 100 includes a glass panel 110, a window frame 120 and a waterproof strip 130. The glass panel 110 is of a substantially rectangular shape. The window frame 120 is made of, for example but not limited to, a rigid plastic material (such as polyurethane (PU)). The frame body 120 is disposed around a periphery of the glass plate 110. A periphery of the window frame 120 is outward extended with an end seat 122. In the embodiment, the end seat 122 and the window frame 120 are in a one-piece form (or integrally formed). The end seat 122 is of a flat plate shape and is perpendicular to a longitudinal direction of the waterproof strip 130. The end seat 122 is disposed with an end plug 123. The end plug 123 projects from the end seat 122. A projecting direction of the end plug 123 is parallel with an outer edge of the window frame 120. The end plug 123 and the window frame 120 are arranged at an interval. In the embodiment, the end plug 123 projects from one of sides of the end seat 122. Another side of the end seat 122 may abut against another waterproof strip. The waterproof strip 130 is a hollow tube made of elastic material (such as, but not limited to, silicone or rubber). The waterproof strip 130 is attached on the outer edge of the window frame 120. The waterproof strip of the movable sunroof device 100 surrounds the window frame 120 and is not extended to the rear edge 101 of the movable sunroof device 100 to make the window frame 120 be exposed at the rear edge 101 to abut against the front edge 201 of the fixed sunroof device 200.

Figure 7:
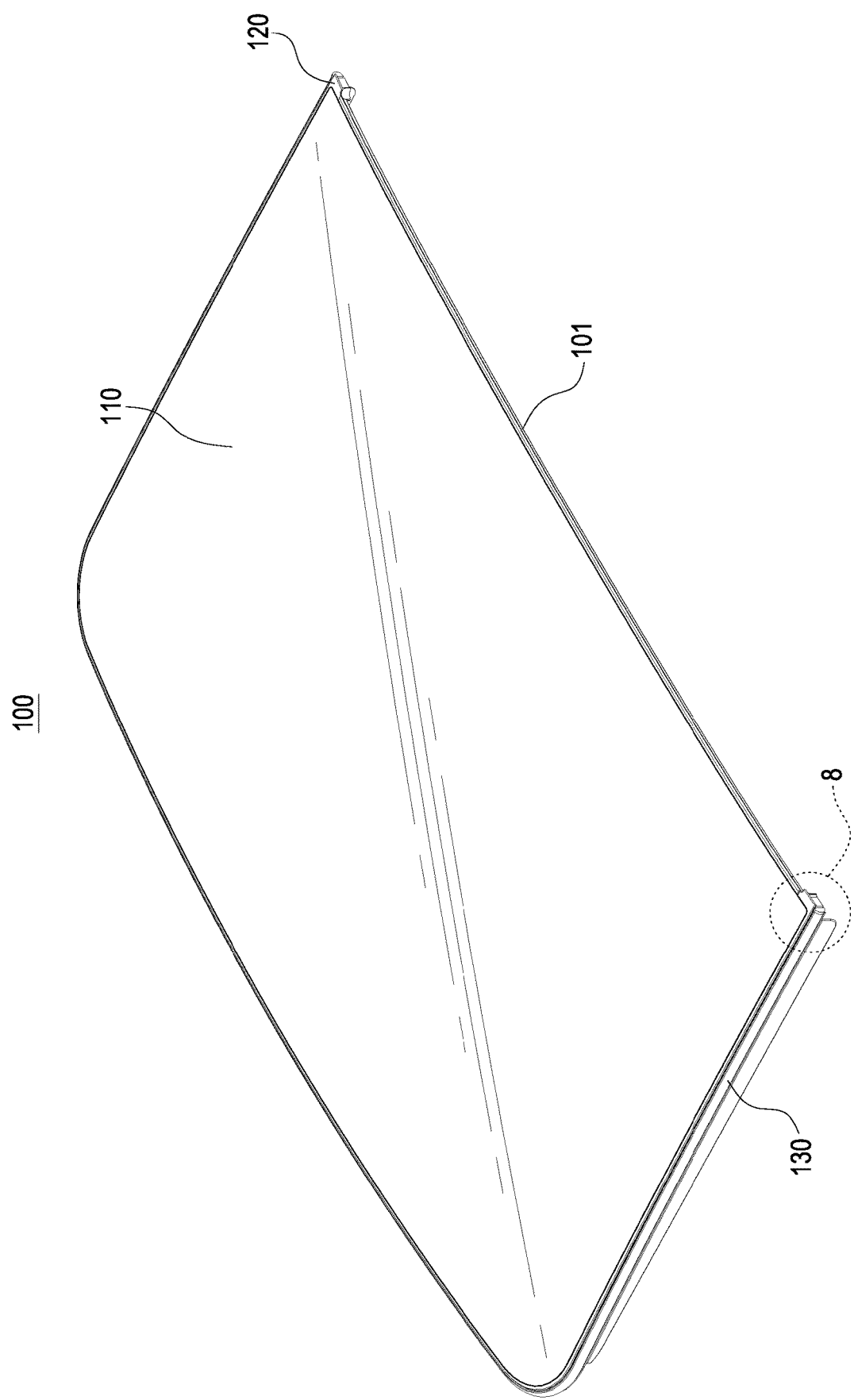
FIG. 7 is a perspective schematic view of the sunroof device of the disclosure.
Figure 8:
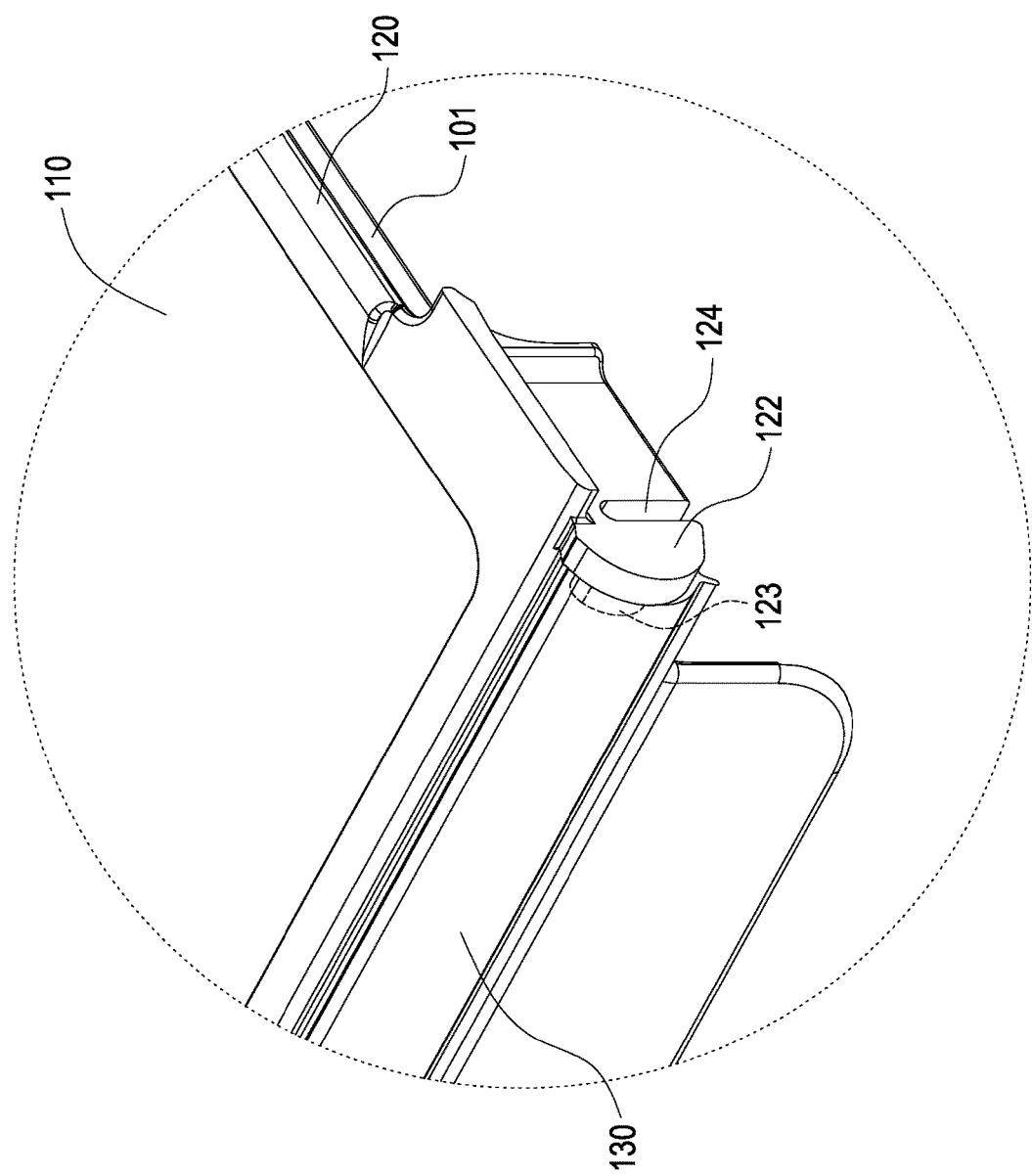
FIG. 8 is a partially enlarged view of area 8 in FIG. 7.

Please refer to FIGS. 6-8. The waterproof strip 130 is in a hollow manner to form a receiving space 132 therein. The receiving space 132 is in a tubular manner. The waterproof strip 130 is arranged to be extended along a part of an outer edge of the window frame 120. The end plug 123 is extended along a longitudinal direction of the waterproof strip 130 to be engaged (embedded) in the receiving space 132 of the waterproof strip 130.

In the embodiment, an outer edge of the frame body 120 is formed with a channel trough 121 extended along an outer edge of the frame body 120. The waterproof strip 130 is disposed in the channel trough 121. An embedding groove 125 is formed in the channel trough 121. A side of the waterproof strip 130 is protruded with an embedding strip 131 embedded in the embedding groove 125, so as to prevent the waterproof strip 130 from escaping transversely. The end seat 122 is formed with a through opening 124. When the end seat 122 is pressed in the window 11, the through opening 124 permits the end seat 122 to be flexibly deformed to shrink back.

In the sunroof device 100 of the disclosure, the window frame 120 is formed with the end seat 122 and the end plug 123 to be engaged with an end of the waterproof strip 130 to position the waterproof strip 130 and to further prevent the end of the waterproof strip 130 from loosening. When assembling the sunroof device 100 of the disclosure, it is unnecessary to assemble a positioning assembly to the window frame 120 for positioning the waterproof strip 130, so that the assembling process may be simplified to be easily assembled.

While this disclosure has been described by means of specific embodiments, numerous modifications and variations could be made thereto by those skilled in the art without departing from the scope and spirit of this disclosure set forth in the claims.

What is claimed is:

1. A sunroof device comprising:
    a glass panel;
    a window frame, disposed on a periphery of the glass panel, comprising an end seat outward extended from a part of a periphery thereof and an end plug disposed on the end seat, the end plug disposed protrusively from the end seat, and a projecting direction of the end plug parallel with an outer edge of the window frame; and
    a waterproof strip, disposed on the outer edge of the window frame and in a hollow manner with a receiving space therein, the receiving space in a tubular manner, and the end plug extended along a longitudinal direction of the waterproof strip to be engaged in the receiving space of the waterproof strip.

2. The sunroof device of claim 1, wherein the waterproof strip is of a hollow tubular shape.

3. The sunroof device of claim 1, wherein the end seat and the window frame are in a one-piece form.

4. The sunroof device of claim 1, wherein the end seat is of a flat plate shape and is perpendicular to the longitudinal direction of the waterproof strip.

5. The sunroof device of claim 4, wherein a through opening is defined on the end seat.

6. The sunroof device of claim 4, wherein the end plug is disposed protrusively from one side of the end seat.

7. The sunroof device of claim 1, wherein a channel trough is disposed on and extended along the outer edge of the frame body, and the waterproof strip is disposed in the channel trough.

8. The sunroof device of claim 7, wherein an embedding groove is disposed in the channel trough, and the waterproof strip comprises an embedding strip disposed protrusively on one side thereof and engaged in the embedding groove.

9. The sunroof device of claim 1, wherein the end plug and the window frame are arranged spacedly.

* * * * *